(12) United States Patent
Mickens et al.

(10) Patent No.: US 11,422,907 B2
(45) Date of Patent: Aug. 23, 2022

(54) DISCONNECTED OPERATION FOR SYSTEMS UTILIZING CLOUD STORAGE

(71) Applicant: MICROSOFT TECHNOLOGY LICENSING, LLC, Redmond, WA (US)

(72) Inventors: James W. Mickens, Bellevue, WA (US); Jeremy E. Elson, Seattle, WA (US); Edmund B. Nightingale, Redmond, WA (US); Bin Fan, Pittsburgh, PA (US); Asim Kadav, Madison, WI (US); Osama Khan, San Francisco, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 2017 days.

(21) Appl. No.: 13/970,525

(22) Filed: Aug. 19, 2013

(65) Prior Publication Data
US 2015/0052392 A1    Feb. 19, 2015

(51) Int. Cl.
*G06F 11/20*    (2006.01)

(52) U.S. Cl.
CPC ...... *G06F 11/2069* (2013.01); *G06F 11/2082* (2013.01); *G06F 11/2087* (2013.01)

(58) Field of Classification Search
None
See application file for complete search history.

(56) References Cited

U.S. PATENT DOCUMENTS

| | | |
|---|---|---|
| 4,491,945 A | 1/1985 | Urner |
| 4,780,870 A | 10/1988 | McHarg et al. |

(Continued)

FOREIGN PATENT DOCUMENTS

| | | | | |
|---|---|---|---|---|
| CA | 2840596 A1 * | 1/2013 | ......... | H04L 67/1095 |
| CN | 1664791 | 9/2005 | | |

(Continued)

OTHER PUBLICATIONS

Yen-Hung Kuo; A Hybrid Cloud Storage Architecture for Service Operational High Availability; 2013;IEEE; p. 487-492 (Year: 2013).*

(Continued)

*Primary Examiner* — Amresh Singh
*Assistant Examiner* — Jermaine A Mincey
(74) *Attorney, Agent, or Firm* — Jacob P. Rohwer; Newport IP, LLC

(57) ABSTRACT

While connected to cloud storage, a computing device writes data and metadata to the cloud storage, indicates success of the write to an application of the computing device, and, after indicating success to the application, writes the data and metadata to local storage of the computing device. The data and metadata may be written to different areas of the local storage. The computing device may also determine that it has recovered from a crash or has connected to the cloud storage after operating disconnected and reconcile the local storage with the cloud storage. The reconciliation may be based at least on a comparison of the metadata stored in the area of the local storage with metadata received from the cloud storage. The cloud storage may store each item of data contiguously with its metadata as an expanded block.

19 Claims, 5 Drawing Sheets

(56) References Cited

U.S. PATENT DOCUMENTS

| | | |
|---|---|---|
| 5,305,320 A | 4/1994 | Andrews et al. |
| 5,408,649 A | 4/1995 | Beshears et al. |
| 5,423,046 A | 6/1995 | Nunnelley et al. |
| 5,446,915 A | 8/1995 | Pierce |
| 5,553,285 A | 9/1996 | Krakauer et al. |
| 5,621,884 A | 4/1997 | Beshears et al. |
| 5,663,951 A | 9/1997 | Danneels et al. |
| 5,778,384 A | 7/1998 | Provino et al. |
| 5,914,878 A | 6/1999 | Yamamoto et al. |
| 5,938,732 A | 8/1999 | Lim et al. |
| 5,970,232 A | 10/1999 | Passint et al. |
| 6,230,252 B1 | 5/2001 | Passint et al. |
| 6,424,979 B1 | 7/2002 | Livingston et al. |
| 6,480,970 B1* | 11/2002 | DeKoning .......... G06F 11/2069 714/5.11 |
| 6,577,613 B1 | 6/2003 | Ramanathan |
| 6,728,747 B1 | 4/2004 | Jenkins et al. |
| 6,850,489 B1 | 2/2005 | Omi et al. |
| 6,871,295 B2 | 3/2005 | Ulrich et al. |
| 6,963,996 B2 | 11/2005 | Coughlin |
| 7,076,555 B1 | 7/2006 | Orman et al. |
| 7,107,606 B2 | 9/2006 | Lee |
| 7,113,993 B1 | 9/2006 | Cappiello et al. |
| 7,115,919 B2 | 10/2006 | Kodama |
| 7,139,933 B2 | 11/2006 | Hsu et al. |
| 7,165,256 B2 | 1/2007 | Boudnik et al. |
| 7,171,491 B1 | 1/2007 | O'Toole et al. |
| 7,180,875 B1 | 2/2007 | Neumiller et al. |
| 7,184,958 B2 | 2/2007 | Kagoshima et al. |
| 7,231,475 B1 | 6/2007 | Singla et al. |
| 7,240,358 B2 | 7/2007 | Horn et al. |
| 7,272,613 B2 | 9/2007 | Sim et al. |
| 7,342,876 B2 | 3/2008 | Bellur et al. |
| 7,356,213 B1 | 4/2008 | Cunningham et al. |
| 7,383,288 B2 | 6/2008 | Miloushev et al. |
| 7,430,568 B1* | 9/2008 | DeKoning .......... G06F 11/0727 |
| 7,433,332 B2 | 10/2008 | Golden et al. |
| 7,437,407 B2 | 10/2008 | Vahalia et al. |
| 7,496,233 B2 | 2/2009 | Kirihara et al. |
| 7,577,817 B2 | 8/2009 | Karpoff et al. |
| 7,610,348 B2 | 10/2009 | Kisley et al. |
| 7,657,581 B2 | 2/2010 | Orenstein et al. |
| 7,725,437 B2 | 5/2010 | Kirshenbaum et al. |
| 7,756,826 B2 | 7/2010 | Bots et al. |
| 7,769,843 B2 | 8/2010 | Neuse et al. |
| 7,774,469 B2 | 8/2010 | Massa et al. |
| 7,779,148 B2 | 8/2010 | Arimilli et al. |
| 7,797,453 B2 | 9/2010 | Meijer et al. |
| 7,801,994 B2 | 9/2010 | Kudo |
| 7,805,580 B2 | 9/2010 | Hirzel et al. |
| 7,817,880 B1 | 10/2010 | Drost et al. |
| 7,840,136 B1 | 11/2010 | Cunningham et al. |
| 7,916,703 B2 | 3/2011 | Yang et al. |
| 7,921,267 B1 | 4/2011 | Yadav et al. |
| 7,930,595 B2 | 4/2011 | Gooding |
| 8,001,352 B1 | 8/2011 | Chatterjee et al. |
| 8,010,829 B1 | 8/2011 | Chatterjee et al. |
| 8,037,478 B2 | 10/2011 | Tanaka et al. |
| 8,041,760 B2 | 10/2011 | Mamou et al. |
| 8,074,107 B2 | 12/2011 | Sivasubramanian et al. |
| 8,160,063 B2 | 4/2012 | Maltz et al. |
| 8,181,061 B2 | 5/2012 | Nightingale et al. |
| 8,195,950 B2 | 6/2012 | Spearman |
| 8,234,518 B2 | 7/2012 | Hansen |
| 8,261,033 B1 | 9/2012 | Slik et al. |
| 8,266,136 B1 | 9/2012 | Pogde et al. |
| 8,274,987 B2 | 9/2012 | Jia |
| 8,296,398 B2 | 10/2012 | Lacapra et al. |
| 8,296,408 B2 | 10/2012 | Anke et al. |
| 8,327,370 B2 | 12/2012 | Atyam et al. |
| 8,438,244 B2 | 5/2013 | Nightingale et al. |
| 8,473,582 B2* | 6/2013 | Ananthanarayanan ...... G06F 17/30132 709/212 |
| 9,170,892 B2 | 10/2015 | Nightingale et al. |
| 9,268,651 B1* | 2/2016 | Salyers ............ G06F 11/1464 |
| 9,778,856 B2 | 10/2017 | Fan et al. |
| 9,813,529 B2 | 11/2017 | Elson et al. |
| 2001/0042157 A1 | 11/2001 | Pascucci et al. |
| 2002/0083134 A1 | 6/2002 | Bauer, Jr. et al. |
| 2002/0093948 A1 | 7/2002 | Dertz et al. |
| 2002/0152293 A1 | 10/2002 | Hahn et al. |
| 2002/0194245 A1 | 12/2002 | Simpson et al. |
| 2003/0014393 A1 | 1/2003 | Kabra et al. |
| 2003/0117982 A1 | 6/2003 | Minnick |
| 2003/0131207 A1 | 7/2003 | Arakawa et al. |
| 2004/0085953 A1 | 5/2004 | Davis |
| 2004/0153479 A1 | 8/2004 | Mikesell et al. |
| 2004/0236983 A1 | 11/2004 | Burton et al. |
| 2005/0075911 A1 | 4/2005 | Craven, Jr. |
| 2005/0078655 A1 | 4/2005 | Tiller et al. |
| 2005/0094640 A1 | 5/2005 | Howe |
| 2005/0111423 A1 | 5/2005 | Anderson et al. |
| 2005/0138186 A1 | 6/2005 | Hesselink et al. |
| 2005/0256972 A1 | 11/2005 | Cochran et al. |
| 2005/0262097 A1 | 11/2005 | Sim-Tang et al. |
| 2006/0004759 A1 | 1/2006 | Borthakur et al. |
| 2006/0015495 A1 | 1/2006 | Keating et al. |
| 2006/0074946 A1 | 4/2006 | Pham |
| 2006/0098572 A1 | 5/2006 | Zhang et al. |
| 2006/0129614 A1 | 6/2006 | Kim et al. |
| 2006/0159456 A1 | 7/2006 | Gumaste et al. |
| 2006/0280168 A1 | 12/2006 | Ozaki |
| 2006/0288080 A1 | 12/2006 | Orszag et al. |
| 2007/0025381 A1 | 2/2007 | Feng et al. |
| 2007/0036093 A1 | 2/2007 | Newberg et al. |
| 2007/0043824 A1 | 2/2007 | Fremantle |
| 2007/0094691 A1 | 4/2007 | Gazdzinski |
| 2007/0147322 A1 | 6/2007 | Agrawal et al. |
| 2007/0153755 A1 | 7/2007 | Yang et al. |
| 2007/0156842 A1 | 7/2007 | Vermeulen et al. |
| 2007/0158432 A1 | 7/2007 | Tadamasa |
| 2007/0204028 A1 | 8/2007 | Lee |
| 2007/0230493 A1 | 10/2007 | Dravida et al. |
| 2007/0248089 A1 | 10/2007 | Redi et al. |
| 2007/0266208 A1 | 11/2007 | Kim et al. |
| 2007/0266244 A1 | 11/2007 | Walker et al. |
| 2007/0282787 A1 | 12/2007 | Shirai et al. |
| 2007/0286135 A1 | 12/2007 | Kirke |
| 2008/0005275 A1 | 1/2008 | Overton et al. |
| 2008/0010400 A1 | 1/2008 | Moon |
| 2008/0098392 A1 | 4/2008 | Wipfel et al. |
| 2008/0104442 A1 | 5/2008 | Diao et al. |
| 2008/0114827 A1 | 5/2008 | Gerber et al. |
| 2008/0162622 A1 | 7/2008 | Becker et al. |
| 2008/0215727 A1 | 9/2008 | Denis et al. |
| 2008/0222080 A1 | 9/2008 | Stewart et al. |
| 2008/0222104 A1 | 9/2008 | Stewart et al. |
| 2008/0256138 A1 | 10/2008 | Sim-Tang |
| 2008/0320138 A1 | 12/2008 | Wada |
| 2009/0006888 A1 | 1/2009 | Bernhard et al. |
| 2009/0097443 A1 | 4/2009 | Pasanen et al. |
| 2009/0106269 A1 | 4/2009 | Zuckerman et al. |
| 2009/0109891 A1 | 4/2009 | Fonseca, Jr. et al. |
| 2009/0112921 A1 | 4/2009 | Oliveira et al. |
| 2009/0113323 A1 | 4/2009 | Zhao et al. |
| 2009/0144422 A1 | 6/2009 | Chatley et al. |
| 2009/0164790 A1 | 6/2009 | Pogodin |
| 2009/0183002 A1 | 7/2009 | Rohrer et al. |
| 2009/0198958 A1 | 8/2009 | Arimilli et al. |
| 2009/0201923 A1 | 8/2009 | Menon et al. |
| 2009/0204405 A1 | 8/2009 | Kato et al. |
| 2009/0213731 A1 | 8/2009 | Bhasin et al. |
| 2009/0249418 A1 | 10/2009 | Alastruey Gracia et al. |
| 2009/0259665 A1 | 10/2009 | Howe et al. |
| 2009/0265218 A1 | 10/2009 | Amini et al. |
| 2009/0268611 A1 | 10/2009 | Persson et al. |
| 2009/0271412 A1 | 10/2009 | Lacapra et al. |
| 2009/0300407 A1 | 12/2009 | Kamath et al. |
| 2009/0307329 A1 | 12/2009 | Olston et al. |
| 2009/0313438 A1 | 12/2009 | Krishnaprasad et al. |
| 2010/0005151 A1 | 1/2010 | Gokhale |
| 2010/0008230 A1 | 1/2010 | Khandekar et al. |
| 2010/0008347 A1 | 1/2010 | Qin et al. |

(56) References Cited

U.S. PATENT DOCUMENTS

| | | |
|---|---|---|
| 2010/0017444 A1 | 1/2010 | Chatterjee |
| 2010/0061366 A1 | 3/2010 | DelRegno et al. |
| 2010/0094955 A1 | 4/2010 | Zuckerman et al. |
| 2010/0094956 A1 | 4/2010 | Zuckerman et al. |
| 2010/0153639 A1 | 6/2010 | Corry et al. |
| 2010/0161657 A1 | 6/2010 | Cha et al. |
| 2010/0169287 A1 | 7/2010 | Klose |
| 2010/0191919 A1 | 7/2010 | Bernstein et al. |
| 2010/0198888 A1 | 8/2010 | Blomstedt et al. |
| 2010/0198972 A1 | 8/2010 | Umbehocker |
| 2010/0228835 A1 | 9/2010 | Pitts |
| 2010/0250648 A1 | 9/2010 | Cao et al. |
| 2010/0250746 A1 | 9/2010 | Murase |
| 2010/0277345 A1 | 11/2010 | Rodriguez et al. |
| 2010/0332454 A1 | 12/2010 | Prahlad et al. |
| 2010/0332818 A1 | 12/2010 | Prahlad et al. |
| 2011/0022574 A1 | 1/2011 | Hansen |
| 2011/0075628 A1 | 3/2011 | Cho et al. |
| 2011/0083154 A1 | 4/2011 | Boersma |
| 2011/0099126 A1 | 4/2011 | Belani et al. |
| 2011/0145442 A1 | 6/2011 | Diab |
| 2011/0145818 A1 | 6/2011 | Vermuri et al. |
| 2011/0153835 A1 | 6/2011 | Rimae et al. |
| 2011/0161723 A1 | 6/2011 | Taleck et al. |
| 2011/0205974 A1 | 8/2011 | Zhu et al. |
| 2011/0208837 A1 | 8/2011 | Sartori |
| 2011/0219208 A1 | 9/2011 | Asaad et al. |
| 2011/0228789 A1 | 9/2011 | Jia |
| 2011/0246471 A1 | 10/2011 | Rakib |
| 2011/0246735 A1 | 10/2011 | Bryant et al. |
| 2011/0258290 A1 | 10/2011 | Nightingale et al. |
| 2011/0258297 A1 | 10/2011 | Nightingale et al. |
| 2011/0258482 A1 | 10/2011 | Nightingale et al. |
| 2011/0258488 A1 | 10/2011 | Nightingale et al. |
| 2011/0283019 A1 | 11/2011 | Bennett et al. |
| 2011/0292949 A1 | 12/2011 | Hayashi et al. |
| 2011/0296025 A1 | 12/2011 | Lieblich et al. |
| 2011/0307886 A1 | 12/2011 | Thanga et al. |
| 2012/0041976 A1 | 2/2012 | Annapragada |
| 2012/0042130 A1* | 2/2012 | Peapell ............... G06F 12/0866 711/126 |
| 2012/0042162 A1 | 2/2012 | Anglin et al. |
| 2012/0047239 A1 | 2/2012 | Donahue et al. |
| 2012/0047339 A1* | 2/2012 | Decasper ............ G06F 11/1076 711/162 |
| 2012/0054556 A1 | 3/2012 | Grube et al. |
| 2012/0158948 A1 | 6/2012 | Pang et al. |
| 2012/0197958 A1 | 8/2012 | Nightingale et al. |
| 2012/0207036 A1 | 8/2012 | Ong et al. |
| 2012/0224481 A1 | 9/2012 | Babiarz et al. |
| 2012/0256735 A1 | 10/2012 | Gilson |
| 2012/0278400 A1 | 11/2012 | Elson et al. |
| 2013/0042156 A1 | 2/2013 | Srinivasan et al. |
| 2013/0117240 A1 | 5/2013 | Taylor et al. |
| 2013/0263184 A1* | 10/2013 | Melnychenko ...... H04N 21/482 725/50 |
| 2014/0068224 A1 | 3/2014 | Fan et al. |
| 2014/0101234 A1* | 4/2014 | Lee ..................... H04L 67/1097 709/203 |
| 2014/0279893 A1* | 9/2014 | Branton ............ G06F 17/30994 707/634 |
| 2015/0052392 A1 | 2/2015 | Mickens et al. |

FOREIGN PATENT DOCUMENTS

| | | |
|---|---|---|
| CN | 102057366 A | 9/2005 |
| CN | 1871806 A | 11/2006 |
| CN | 1975679 A | 6/2007 |
| CN | 101411096 A | 4/2009 |
| CN | 101420786 A | 4/2009 |
| CN | 101431510 A | 5/2009 |
| CN | 101656644 A | 2/2010 |
| CN | 101902776 A | 12/2010 |
| CN | 102414692 A | 4/2012 |
| CN | 102930227 A | 2/2013 |
| EP | 2192729 | 6/2010 |
| WO | WO03038628 A1 | 5/2003 |
| WO | WO2010108368 A1 | 9/2010 |
| WO | WO2913/068023 A1 | 5/2013 |

OTHER PUBLICATIONS

Jiyi Wu; Cloud Storage as the Infrastructure of Cloud Computing; 2010; IEEE; pp. 380-383 (Year: 2010).*

The European Office Action dated May 23, 2014 for European patent application No. 12776594.9, a counterpart foreign application of U.S. Appl. No. 13/096,194, 6 pages.

The Supplementary European Search Report dated May 13, 2014 for European Patent Application No. 12776594.9, 4 pages.

Office action for U.S. Appl. No. 13/112,978 dated May 22, 14, Elson et al., "Data Layout for Recovery and Durability", 11 pages.

Office Action for U.S. Appl. No. 13/017,193, dated Jul. 18, 2014, Edmund B. Nightingale, "Parallel Serialization of Request Processing", 21 pages.

The European Office Action dated Oct. 6, 2014 for European patent application No. 12776594.9, a counterpart foreign application of U.S. Appl. No. 13/096,194, 6 pages.

Office Action for U.S. Appl. No. 13/116,270, dated Aug. 14, 2014, Edmund B. Nightingale, "Server Failure Recovery", 15 pages.

Corbett et.al. "The Vesta Parallel File System", ACM Transactions on Computer Systems, vol. 14, No. 3, Aug. 1996, 40 pgs.

He et al, "Performance Evaluation of Distributed iSCSI Raid", Proc of Intl Workshop on Storage Network Architecture and Parallel IOs, Sep. 2003, 8 pgs.

International Search Report for PCT Application No. PCTUS2013056070, dated Nov. 20, 2013, Filed Date Aug. 22, 2013, 11 pgs.

"Introduction to the Azure Platform", Microsoft Patterns & Practices, retrieved at http:f/msdn.microsoft.com/en-us/libraryfff803364.aspx, Dec. 6, 2011, pp. 1-13.

Lesem, Steve, "Cloud Storage Strategy", Cloud Taxonomy Archives, retrieved at http:f/cloudstoragestrategy.com/cloud-taxonomy, Jan. 24, 2012, pp. 1-21.

Office action for U.S. Appl. No. 13/096,194, dated Nov. 6, 14, Elson et al., "Effective Circuits in Packet-Switched Networks", 25 pages.

Office action for U.S. Appl. No. 13/112,978, dated Dec. 3, 2014, Elson, et al., "Data Layout for Recovery and Durability", 14 pages.

Ousterhout et al., "The Case for RAMClouds-Scalable High-Performance Storage Entirely in DRAM", SIGOPS Operating Systems Review, vol. 43, No. 4, Dec. 2009, pp. 92-105.

The European Office Action dated Apr. 1, 2015 for European patent application No. 1276594.9, a counterpart foreign application of U.S. Appl. No. 13/096,194, 6 pages.

Office action for U.S. Appl. No. 13/116,270, dated Mar. 12, 2015, Nightingale et al., "Server Failure Recovery", 9 pages.

Office action for U.S. Appl. No. 13/112,978, dated Apr. 3, 2015, Elson et al., "Data Layout for Recovery and Durability", 16 pages.

Office Action for U.S. Appl. No. 13/598,990, dated Apr. 9, 2015, Fan et al., "Block-level Access to Parallel Storage", 18 pages.

Office Action for U.S. Appl. No. 13/598,990, dated Sep. 11, 2014, Fan et al., "Block-level Access to Parallel Storage", 8 pages.

Translated the Chinese Office Action dated Jun. 3, 2015 for Chinese patent application No. 201280020755.7, a counterpart foreign application of U.S. Appl. No. 13/096,194, 15 pages.

Office action for U.S. Appl. No. 13/096,194, dated May 27, 2015, Elson et al., "Effective Circuits in Packet-Switched Networks", 27 pages.

Qin, et al., "Test and Simulation System of the Ad Hoc Network Based on Height Speed Ethernet", Computer Applications, Roll 26, Issue 6, Jan. 2006, pp. 1298-1300.

The European Office Action dated Oct. 29, 2015 for European patent application No. 12776594.9, a counterpart foreign application of U.S. Appl. No. 13/096,194, 8 pages.

International Search Report and Written Opinion for PCT Application No. PCTUS2014051397, dated Oct. 28, 2015, 18 pgs.

(56) References Cited

OTHER PUBLICATIONS

Office action for U.S. Appl. No. 13/112,978 dated Nov. 6, 2015, Elson et al., "Data Layout for Recovery and Durability", 16 pages.
Office action for U.S. Appl. No. 13/096,194, dated Feb. 7, 2014, Elson, et al., "Effective Circuits in Packet-Switched Networks", 23 pages.
U.S. Appl. No. 12/410,697, "Data Center Without Structural Bottlenecks," Maltz etal, filed Mar. 25, 2009.
U.S. Appl. No. 12/410,745, "Data Center Interconnect and Traffic Engineering," Maltz et al, filed Mar. 25, 2009.
U.S. Appl. No. 12/578,608, "Agile Data Center Network Architecture," Greenberg et al, filed Oct. 14, 2009.
U.S. Appl. No. 13/598,990, "Block Level Access to Parallel Storage", Fan et al, filed Aug. 30, 2012.
Akturk, "Asynchronous Replication of Metadata Across Multi-Master Servers in Distributed Data Storage Systems", A Thesis Submitted to Louisiana State University and Agricultural and Mechanical College, Dec. 2009, 70 pages.
Bafna et al, "CHIRAYU: A Highly Available Metadata Server for Object Based Storage Cluster File System," retrieved from <<http://abhinaykampasi.tripod.com/TechDocs/ChirayuPaper.pdf>>, IEEE Bombay Section, Year 2003 Prof K Shankar Student Paper & Project Contest, Apr. 2003, 6 pgs.
Baratto et al., "Thing: A Remote Display Architecture for Thin-Client Computing", In Technical Report CUCS-027-04, Jul. 2004, 15 pages.
Bonwick et al., "ZFS: The Last Word in File Systems", retrieved at <<wiki.illumos.org/download/attachments/1146951zfs_last.pdf>>, Sun microsystems, Sep. 2008, 44 pages.
Borthakur, "The Hadoop Distributed File System: Architecture and Design", retrieved at <<http://hadoop.apache.org/docs/stable/hdfs_design.html>>, The Apache Software Foundation, Mar. 2013, 8 pages.
Braam, "The Lustre Storage Architecture", Cluster File Systems, Inc., Aug. 2004, 439 pages.
Buddhikot et al, "Design of a Large Scale Multimedia Storage Server," Journal Computer Networks and ISDN Systems, vol. 27, Issue 3, Dec. 1994, pp. 1-18.
Carnes rt al., "PVFS: A Parallel File System for Linux Clusters", In Proceedings of the Extreme Linux Track: 4th Annual Linux Showcase and Conference, Oct. 2000, 11 pages.
Chen et al, "Replication-Based Highly Available Metadata Management for Cluster File Systems," 2010 IEEE International Conference on Cluster Computing, Sep. 2010, pp. 292-301.
"Citrix Storage Delivery Services Adapter for NetApp Data ONTAP", retrieved on Mar. 9, 2010 at <<http://citrix.com/site/resources/dynamic/partnerDocs/datasheet_adapter.pdf>>, Citrix Systems, Citrix Storage Delivery Services Data sheet, 2008, 2 pgs.
"Citrix Xen-Desktop Virtualization Desktop Infrastructure", retrieved on Jun. 11, 2013 at <<http://www.citrix.com/solutions/desktop-virtualization/overview.html>> Citrix Systems, Inc., 2 pages.
Norton et al., "Common Internet File System (CIFS) Technical Reference", Storage Networking Industry Association, Mar. 2002, 150 pages.
"EMC RecoverPoint Family: Cost-Effective Local and Remote Data Protection and Disaster Recovery Solution", retrieved on Mar. 9, 2010 at <<http://www.emc.com/collateral/software/data-sheet/h2769-emc-recoverpoint-family.pdf>>, EMC Corporation, Data Sheet H2769.8, 2010, 3 pgs.
Fan et al, "A Failure Recovery Mechanism for Distributed Metadata Servers in DCFS2," Seventh International Conference on High Performance Computing and Grid in Asia Pacific Region, Jul. 20-22, 2004, 7 pgs.
Feller, Virtual Desktop Resource Allocation, retrieved at <<http://blogs.citrix.com/2010/11/12/virtual-desktop-resource-allocation>>, Citrix Systems, Inc., Nov. 2010, 2 pages.
Fellows, "Storage Optimization for VDI", Storage Networking Industry Association, 2011, 42 pages.
Fu, et al., "A Novel Dynamic Metadata Management Scheme for Large Distributed Storage Systems", Proceedings of the 2008 10th IEEE International Conference on High Performance Computing and Communications, Sep. 2008, pp. 987-992.
Fullmer et al, "Solutions to Hidden Terminal Problems in Wireless Networks," Proceedings of the ACM SIGCOMM '97 Conference on Applications, Technologies, Architectures, and Protocols for Computer Communication, Cannes, France, Oct. 1997, pp. 39-49.
Ghemawat et al., "The Google File System", In Proceedings of the Nineteenth ACM Symposium on Operating Systems Principles, Oct. 2003, 15 pages.
Greenberg et al., "Towards a Next Generation Data Center Architecture: Scalability and Commoditization", In Proceedings of the ACM Workshop on Programmable Routers for Extensible Service of Tomorrow, Aug. 2008, pp. 57-62.
Hartman et al., "The Zebra Striped Network File System" In Proceedings of the Fourteenth ACM Symposium on Operating Systems Principles, Dec. 1993, pp. 29-43.
Hitz et al., "File System Design for an NFS File Server Appliance" USENIX Winter 1994 Conference, Jan. 1994, 23 pages.
Hopkins et al., "AoE (ATA over Ethernet)", The Brantley Coile Company, Inc., Feb. 2009, 14 pages.
TechNet, "How Dynamic Disks and Volumes Work", available at <<http://technet.microsoft.com/en-us/library/cc758035>>, Microsoft, last updated Mar. 2003, 19 pages.
Howard et al., "Scale and Performance in a Distributed File System", Journal of ACM Transactions on Computer Systems, vol. 6, Issue 1, Feb. 1988, pp. 51-81.
Hsiao et al., "Chained Declustering: A New Availability Strategy for Multiprocessor Database Machines", Sixth Annual Conference on Data Engineering, Feb. 1990, 10 pages.
Isard, et al., "Dryad: Distributed Data-Parallel Programs from Sequential Building Blocks", In Proceedings of the 2nd ACM SIGOPS/EuroSys European Conference on Computer Systems, Mar. 21, 2007, 14 pages.
Technet, "Jetstress Field Guide", retrieved at <<http://gallery.technet.microsoft.com/Jetstress-Field-Guide-1602d64c>>, Microsoft, Inc., Nov. 2010, 1 page.
Kennedy, "Is Parallel Computing Dead", retrieved on Oct. 2, 12, at http://www.crpc.rice.edu/newsletters/oct.94/director.html., Parallel Computing Newsletter, vol. 2, Issue 4, Oct. 1994, 2 pages.
Kistler et al., "Disconnected Operation in the Coda File System", ACM Transactions on Computer Systems, vol. 10, No. 1, Feb. 1992, pp. 3-25.
Krioukov et al., "Parity Lost and Parity Regained", The Proceedings of the 6th USENIX Conference on File and Storage Technologies, Feb. 2008, pp. 127-141.
Lang, "Parallel Virtual File System, Version 2", retrieved on Nov. 12, 2010 from <<http://www.pvfs.org/cvs/pvfs-2-7-branch.build/doc/pvfs2-guide/pvfs2-guide.php>>, Sep. 2003, 39 pages.
Lee et al., "Petal: Distributed Virtual Disks", In The Proceedings of the 7th International Conference on Architectural Support for Porgramming Languages and Operating Systems, vol. 31, No. 9, Sep. 1996, 9 pages.
Lim et al., "Voluntary Disconnected Operations for Energy Efficient Mobile Devices in Pervasive Computing Environments", In Intelligent Automation & Soft Computing, vol. 19, Issue 1, Mar. 2013, pp. 1-12.
Menon et al., "IBM Storage Tank—A heterogeneous scalable SAN file system", IBM Systems Journal, vol. 42, No. 2, Nov. 2003, pp. 250-267.
Mohamed et al, "Extensible Communication Architecture for Grid Nodes," abstract retrieved on Apr. 23, 2010 at <<http://www.computer.org/portal/web/csdl/doi/10.1109/itcc.2004.1286587>>, International Conference on Information Technology: Coding and Computing (ITCC'04), vol. 2, Apr. 5-7, 2004, Las Vegas, NV, 1 pg.
Nightingale et al., "Flat Datacenter Storage", 10th USENIX Symposium on Operating Systems Design and Implementation, Oct. 18, 2012, 15 pages.
Nightingale et al., "Rethink the Sync", 7th USENIX Symposium on Operating Systems Design and Implementation, Nov. 2006, 14 pages.
Office action for U.S. Appl. No. 13/112,978, dated Jan. 16, 2014, Elson, et al., "Data Layout for Recovery and Durability", 18 pages.

(56) References Cited

OTHER PUBLICATIONS

Office Action for U.S. Appl. No. 12/766,726, dated May 29, 12, Nightingale et al., "Bandwidth-Proportioned Datacenters", 21 pages.
Office action for U.S. Appl. No. 13/116,270, dated Aug. 27, 2013, Nightingale, et al., "Server Failure Recovery", 18 pages.
Office action for U.S. Appl. No. 13/096,194, dated Sep. 23, 2013, Elson, et al., "Effective Circuits in Packet-Switched Networks", 26 pages.
Office Action for U.S. Appl. No. 13/412,944, dated Oct. 11, 12, Nightingale et al., "Reading and Writing During Cluster Growth Phase", 10 pages.
Office action for U.S. Appl. No. 13/017,193, dated Dec. 5, 2013, Nightingale, et al., "Parallel Serialization of Request Processing", 19 pages.
Office Action for U.S. Appl. No. 13/112,978, dated Dec. 14, 12, Elson et al., "Data Layout for Recovery and Durability", 13 pages.
Office Action for U.S. Appl. No. 13/017,193, dated Dec. 3, 12, Nightingale et al., "Parallel Serialization of Request Processing", 19 pages.
Office Action for U.S. Appl. No. 13/116,270, dated Feb. 15, 13, Nightingale et al., "Server Failure Recovery", 16 pages.
Office action for U.S. Appl. No. 13/017,193, dated Jun. 3, 13, Nightingale et al., "Parallel Serialization of Request Processing", 21 pages.
Non-Final Office Action for U.S. Appl. No. 13/112,978, dated Jul. 17, 2013, Elson et al., "Data Layout for Recovery and Durability", 15 pages.
Office Action for U.S. Appl. No. 12/763,107, dated Jul. 20, 12, Nightingale et al., "LocatorTable and Client Library for Datacenters", 11 pages.
Non-Final Office Action for U.S. Appl. No. 12/763,133, dated Sep. 16, 2011, Edmund Nightingale, "Memory Management and Recovery for Datacenters", 18 pages.
Pawlowski et al., "NFS Version 3 Design and Implementation", Summer USENIX Conference, Jun. 1994, 15 pages.
The PCT Search Report and Written Opinion dated Oct. 23, 2012 for PCT Application No. PCT/US2012/035700, 10 pages.
Rhea et al., "Maintenance-Free Global Data Storage", IEEE Internet Computing, Sep.-Oct. 2001, pp. 40-49.
Rodeh et al., "zFS—A Scalable Distributed File System Using Object Disks", 20th IEEE/11th NASA Goddard Conference on Mass Storage Systems and Technologies, Apr. 2003, 12 pages.
Satran et al., "Internet Small Computer Systems Interface (iSCSI)", Technical Report, RFC3720, IBM, Apr. 2004, 155 pages.
Schmuck et al., "GPFS: A Shared-Disk File System for Large Computing Clusters", In Proceedings of the Conference on File and Storage Technologies (FAST'02), Jan. 2002, pp. 231-244.
Shepler et al., "Network File System (NFS) Version 4 Minor Version 1 Protocol", Technical Report, RFC 5661, Internet Engineering Task Force, Jan. 2010, 618 pages.
Sinnamohideen et al, "A Transparently-Scalable Metadata Service for the Ursa Minor Storage System," USENIX ATC'10 Proceedings of the 2010 USENIX Conference, Jun. 2010, 14 pgs.
Terry et al, "Managing Update Conflicts in Bayou, a Weakly Connected Replicated Storage System", in Proceedings of the 15th ACM Symposoim on Operating System Principles, Dec. 1995, pp. 172-183.
Verbowski et al., "Flight Data Recorder: Monitoring Persistent-State Interactions to Improve Systems Management", in Proceedings of the 7th USENIX Symposium on Operating Systems Design and Implementation, Nov. 2006, pp. 117-130.
"VMware View—Your Cloud, Your Desktop, Just Got Better", retrieved Jun. 2013 at <<www.vmware.com/files/pdf/view/VMware-View-Datasheet.pdf>>, VMware, Inc., 4 pages.
Vrable et al., "BlueSky: A Cloud-Backed File System for the Enterprise", Proceedings of the 10th USENIX Conference on File and Storage, Feb. 2013, 14 pages.

Vrable et al., "Cumulus: Filesystem Backup to the Cloud", In 7th USENIX Conference on File Storage Technologies, Published Feb. 24, 2009, pp. 1-14.
Vrable, "Migrating Enterprise Storage Applications to the Cloud", In Doctoral Dissertation, University of California, Published 2011, pp. 1-112.
Weil et al., "Ceph: A Scalable, High-Performance Distributed File System" in Proceedings of the 7th USENIX Symposium on Operating Systems Design and Implementation, Nov. 2006, pp. 307-320.
Weil et al, "CRUSH: Controlled, Scalable, Decentralized Placement of Replicated Data," Proceedings of SC '06, Nov. 2006, 12 pgs.
Weinsberg et al., "A Programming Model and System Support for Disconnected-Aware Applications on Resource-Constrained Devices", in Proceedings of the 24th International Conference on Software Engineering, May 2002, pp. 374-384.
Weiser, "Some Computer Science Issues in Ubiquitous Computing," retrieved at <<https://www.cs.ucsb.edu/~ravenben/papers/coreos/Wei93.pdf>>, Mar. 1993, 14 pgs.
Welch et al., "Scalable Performance of the Panasas Parallel File System" in Proceedings of the 8th USENIX Conference on File and Storage Technologies, Feb. 2008, pp. 17-33.
Technet, "Windows PE Technical Reference", available at <<http://technet.microsoft.com/en-us/library/dd744322>>, Microsoft, Oct. 2009, 2 pages.
Translated the Chinese Office Action dated Feb. 2, 2016 for Chinese patent application No. 201280020755.7, a counterpart foreign application of U.S. Appl. No. 13/096,194, 7 pages.
The European Office Action dated Apr. 6, 2016 for European patent application No. 12776594.9, a counterpart foreign application of U.S. Appl. No. 13/096,194, 8 pages.
Office action for U.S. Appl. No. 13/112,978, dated Feb. 25, 2016, Elson et al., "Data Layout for Recovery and Durability", 17 pages.
CN Patent Application No. 20138004574.0, First Office Action and Search Report dated Oct. 28, 2016, 16 pages.
EP Patent Application No. 14759385.9, Rule 71(3), dated Jan. 16, 2017, 31 pages.
U.S. Appl. No. 13/598,990, Non Final Office Action dated Dec. 20, 2016, 14 pages.
Corbett, Peter F., et al., The Vesta Parallel File System, ACM Transactions Computer Systems, vol. 14, No. 3, Aug. 1996, 40 pages.
Second Office Action and Search Report Issued in CN Patent Application No. 201380045740.0, dated Apr. 1, 2017, 16 pages.
U.S. Appl. No. 13/598,990, Notice of Allowance dated Jun. 8, 2017, 8 pages.
U.S. Appl. No. 13/096,194, Notice of Allowance dated Jul. 19, 2017, 5 pages.
"Office Action Issued in European Patent Application No. 12776594.9", dated Aug. 11, 2016, 7 Pages.
"Final Office Action Issued in U.S. Appl. No. 13/598,990", dated Jun. 30, 2016, 20 Pages.
"Office Action Issued in European Patent Application No. 13759363.8", dated Jan. 19, 2018, 6 Pages.
"Third Office Action Issued in Chinese Patent Application No. 201380045740.0", dated Jul. 28, 2017, 6 Pages.
"First Office Action Issued in Chinese Patent Application No. 201480046028.7", dated Jul. 30, 2018, 11 Pages.
"First Office Action Issued in Chinese Patent Application No. 201610389666.X", dated May 17, 2018, 12 Pages.
"Second Office Action Issued in Chinese Patent Application No. 201480046028.7", dated Mar. 5, 2019, 5 Pages.
Kuri, et al., "Reliable Multicast in Multi-Access Wireless LANs", In Journal of Wireless Networks, vol. 7, Issue 4, Sep. 1, 2001, pp. 359-369.
"Second Office Action Issued in Chinese Patent Application No. 201610389666.X", dated Dec. 10, 2018, 7 Pages.
"Office Action Issued in Brazil Patent Application No. BR112015003406-3", dated Jan. 14, 2020, 5 Pages.
"Office Action Issued in Indian Patent Application No. 437/CHENP/2015", dated Mar. 16, 2020, 8 Pages.

\* cited by examiner

DISCONNECTED OPERATION FOR SYSTEMS UTILIZING CLOUD STORAGE

BACKGROUND

Increasingly, data is stored on and retrieved from the cloud. Cloud computing enables storage and retrieval operations to be spread across a large number of devices. By involving a large number of devices in a given read from or write to the cloud, the cloud may even offer faster storage and retrieval to a computing device than is available on local storage of that computing device.

To utilize cloud storage, a computing device must be connected to the cloud, typically via a network. While connected, the computing device reads data from the cloud and writes data to the cloud. This dependence on connectivity to the cloud poses problems when the computing device is not connected to the cloud. One approach to disconnected operation is for the computing device to locally store writes while disconnected from the cloud and provide those writes to the cloud upon reconnecting. This approach provides no ability to read data that was stored on the cloud during disconnected operation, however. Another approach to disconnected operation is for the computing device to locally mirror writes to the cloud while connected and locally store writes while disconnected. This approach enables reads during disconnected operation but to make the techniques resilient to local mirror crashes, clients need to compare the entirety of the local mirror contents to the corresponding data in the cloud. Further harming performance, locally mirroring every write in a synchronous fashion degrades performance if writing to the mirror is slower than writing to the cloud, causing applications to wait longer for indications of the success or failure of their writes.

SUMMARY

While connected to cloud storage, a computing device writes data and metadata to the cloud storage and asynchronously mirrors the data and the metadata to local storage of the computing device. By asynchronously mirroring the write, the application requesting the write is enabled to continue processing without awaiting a result of the mirrored write to the local storage. When mirroring the write to the local storage, the computing device writes the data and metadata to separate areas of the local storage. During reconciliation of the local storage with the cloud storage following a crash or disconnected mode, the computing device only needs to examine the area of local storage that includes the metadata and compare the metadata from that area to metadata retrieved from the cloud storage. Because the cloud storage may be significantly faster than the local storage, the cloud storage may store the data and metadata differently than the local client stores those items. For example, the client may keep data and metadata in two different areas of the local storage, while the cloud storage may store expanded blocks that each include a data item and its associated metadata in contiguous storage. These different techniques for storing data and metadata in the local and cloud storages improve the speed of reconciling the local and cloud storages.

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
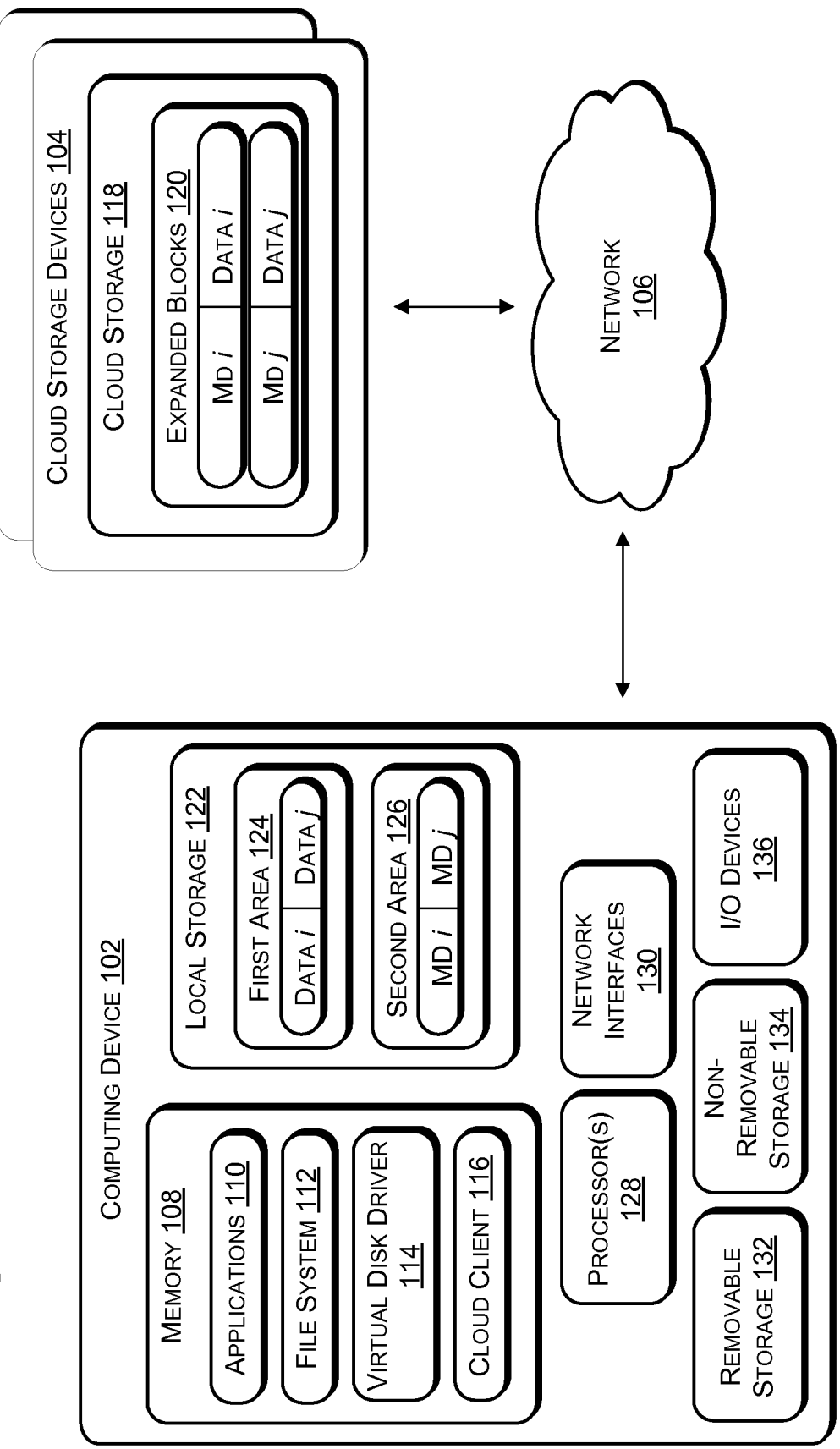
FIG. 1 illustrates an example computing device and cloud storage devices configured to store metadata and data in different manners to improve the speed of reconciling cloud and local storage. The computing device is also configured to write to the cloud storage devices and asynchronously mirror writes to local storage of the computing device.

This disclosure describes, in part, techniques for enabling continued operation during network outages and improved reconciliation between a computing device and the cloud following a crash or disconnected operation. In order for the computing device to satisfy reads when the network is down, a cloud client of the computing device writes to cloud storage and asynchronously mirrors those writes to local storage of the computing device. As used herein, the term "mirror" refers to writing substantially the same data metadata to two different storage components. The data and metadata may, however, be stored differently in the different storage components. The term "asynchronously mirror" refers to providing an indication to the application which generated the write that the write was successful without awaiting a result of mirroring the write to the local storage. From the perspective of the application that generated the write, the write operation is finished when the cloud acknowledges that the write was successful. The application does not have to wait for the local data and metadata writes to complete, because the cloud client handles those events asynchronously, without blocking the application.

In various embodiments, when the cloud client mirrors the write to the local storage, it writes data and metadata associated with that data to different areas of the local storage. For example the cloud client may write multiple data items to a first area of the local storage and multiple corresponding metadata records to a separate area of the local storage. Because the metadata is much smaller than its associated data, the second area may be much smaller in size than the first area. In contrast to this, the cloud storage may store each data item contiguously with its corresponding metadata record as an expanded block. The cloud storage may store the data and metadata in this manner to minimize the number of seeks performed on the cloud storage if the cloud storage uses a seek-based storage medium like a hard disk.

Storing metadata records in a separate area of local storage and in expanded blocks of cloud storage improves the speed of reconciliation between the local storage and cloud storage. After a crash or following disconnected operation, the cloud client need only use the much smaller second area of the local storage rather than the entire local storage. This may be advantageous if the local storage is slow relative to the cloud storage. This area of metadata records is compared to metadata retrieved from the cloud storage. Based on the result of the comparison, the cloud client then reconciles the local storage and cloud storage.

In various embodiments, the cloud client ensures the integrity of the data mirrored to the local storage by writing the data before the metadata in connected mode, and writing the metadata before the data in disconnected mode. For example, the cloud client operating in connected mode may write a data item and its metadata record to the cloud, mirror the write of the data item to local storage, and crash. The cloud storage now has the updated metadata record and the local storage has either a previous metadata record or a default record. The cloud client will reconcile the local storage and cloud storage, comparing version identifiers in the metadata records which will indicate that the cloud storage has a more recent version of the data item (note that this is incorrect but harmless; the local storage has updated data, but not updated metadata, and the updated data of the local storage will be overwritten with the same updated data stored in the cloud). Based on the comparison, the cloud client will update the local storage with the data item and metadata record from the cloud storage. If the initial writes of metadata and data to the local storage were reversed, and the computing device crashed after writing the metadata record to local storage but before writing the data item, the reconciliation would have wrongly indicated that the local storage has the same version of the data item as the cloud storage.

The order of writing data and metadata to the local storage is reversed in disconnected mode because, in that mode, the local storage has the most recent version of the data. For example, a computing device operating in disconnected mode may write a metadata record for a data item to local storage and, before writing the data item to local storage, crash and then immediately reconnect to the cloud storage. Upon entering connected mode, the cloud client may reconcile the local storage with the cloud storage. In this example the reconciliation would indicate (incorrectly, but harmlessly) that the local storage has the more recent version of the data item, resulting in the data item being used to update the data item stored in cloud storage. If the initial writes of metadata and data to the local storage were reversed, and the computing device wrote the data but not the updated metadata record to local storage, the reconciliation would have wrongly indicated that the local storage has the same version of the data item as the cloud storage, resulting in an inconsistency between the cloud storage and local storage.

Example Devices

FIG. 1 illustrates an example computing device and cloud storage devices configured to store metadata and corresponding data in different manners to improve the speed of reconciling cloud and local storage. The computing device is also configured to asynchronously mirror writes to the cloud storage devices to local storage of the computing device. As illustrated, a computing device 102 is connected to cloud storage devices by a network 106. The computing device includes a memory 108, which stores applications 110, a file system 112, a virtual disk driver 114, and a cloud client 116. The cloud client 116 writes data items and metadata records to cloud storage 118 of the cloud storage devices 104, which store the data items and metadata records as expanded blocks 120. The cloud client 116 then asynchronously mirrors the write to local storage 122 of the computing device, writing the data items to a first area 124 of the local storage 122 and the metadata records to a second area 126 of the local storage 122. To operate the cloud client 116 and other modules 110-114, the computing device 102 includes a processor 128, and to communicate with the cloud storage devices 104 via the network 106, the computing device 102 includes network interfaces 130. Also, the computing device 102 may include removable storage 132, non-removable storage 134, and input/output (I/O) devices 136.

The computing device 102 and the cloud storage devices 104 may each be implemented as any one or more computing devices, such as personal computers (PCs), laptop computers, workstations, server systems, mainframes, server farms, cellular phones, smart phones, tablet computers, media centers, media devices, or any other computing devices. Also, modules and data of the each of the computing device 102 and cloud storage devices 104 may be implemented in a single computing device or distributed among multiple computing devices. In some embodiments, one or more of the computing device 102 and cloud storage devices 104 may be implemented as a virtual machine on a computing device.

In some embodiments, the cloud storage devices 104 form a datacenter-scale store which leverages a full bisection bandwidth network that matches cloud storage disk bandwidth to network interface card (NIC) bandwidth, enabling the cloud storage devices 104 to exchange data at full NIC speeds. In further embodiments, the cloud storage devices 104 store data in units referred to as "tracts" which may have a uniform size (e.g., 8 MB). A plurality of these tracts may form a binary large object (BLOB) or other data container and may be distributed across a plurality of the cloud storage devices 104. In one embodiment, the virtual disk driver 114 may be mapped to a BLOB or other data container by the cloud storage devices 104. An example set of cloud storage devices 104 is described in greater detail in U.S. Pat. No. 8,438,244, entitled "Bandwidth-Proportioned Datacenters" and issued on May 7, 2013.

The network 106 may be or include a public or private packet switched network, such as the Internet, circuit switched network, or combination of packet switched and circuit switched networks. The network 106 may include a plurality of computing devices connected, for example, by one or more wide area networks (WAN), one or more local area networks (LAN), and/or one or more personal area networks (PAN). Communication between these ones of these computing devices of the network 106 may be wired, wireless, or both. These communications may utilize any sort of communication protocol known in the art for sending and receiving messages, such as the Transmission Control Protocol/Internet Protocol (TCP/IP), the Hypertext Transfer Protocol (HTTP), Extensible Messaging and Presence Protocol (XMPP), and/or the Session Initiation Protocol (SIP).

In various embodiments, the memory 108 is volatile (such as RAM), non-volatile (such as ROM, flash memory, etc.) or some combination of the two. As mentioned, the system memory 108 may store applications 110, a file system 112, a virtual disk driver 114, and a cloud client 116. In addition, the memory 108 may also store other modules and data, such as an operating system of the computing device 102. Alternatively, any of modules 110-116 may be implemented in hardware. For example, the cloud client 116 may be implemented in a storage controller.

In some embodiments, applications 110 may be any sort of applications, such as operating system components or third party applications. The applications 110 may be kernel-mode applications or user-mode applications. As described further herein, applications 110 may utilize the file system 112 to make write requests or read requests and may receive in response indications of the success or failure of the write requests or data sought by the read requests.

The file system 112 may be any sort of file system known in the art, such as the NT file system (NTFS) of Microsoft® or the third extended file system (ext3) associated with the Linux® kernel. The file system 112 provides access to application 110 and operating system components seeking to read from or write to a disk, whether actual or virtual. The file system 112 interfaces with a disk driver or virtual disk driver, providing write requests or read requests from applications 110 and other components and receiving responses to those requests.

The virtual disk driver 114 appears to the file system 112 as a driver for a local disk drive, such as a standard serial advanced technology attachment (SATA) drive. Thus, the virtual disk driver 114 enables the applications 110 and file system 112 to be oblivious to the location of the storage. The virtual disk driver 114 may be a kernel-mode component of the operating system of the computing device 102 and may forward read and write requests from the file system 112 to the cloud client 116 and forward responses from the cloud client 116 to the file system 112. While FIG. 1 only shows one instance of a virtual disk driver 114, the memory 108 may store multiple instances of the virtual disk driver 114, one for each virtual disk.

The virtual disk driver 114 may be implemented as a kernel-mode component that is separate from the cloud client 116 to enable the cloud client 116 to operate in user-mode. To minimize the overhead of exchanging data across the user-kernel boundary, the virtual disk driver 114 and cloud client 116 may utilize zero-copy inter-process communication. In other embodiments, the virtual disk driver 114 and cloud client 116 may be the same component.

In various embodiments, the cloud client 116 receives read and write requests as block requests from one or more virtual disk drivers 114. The cloud client 116 translates these block requests into input/output operations that are recognizable by the cloud storage devices 104. Specifically, the cloud client 116 translates offsets representing locations of data in a linear range of bytes to tract identifiers and tract offsets. As mentioned, each virtual disk may be associated with a BLOB or data container that includes multiple tracts. The tract identifier identifies a specific tract that the data referenced by the block request is associated with, and the tract offset identifies a specific location within a tract that is associated with the data. In some embodiments, the cloud client 116 maps the offsets in such a way that data blocks with contiguous offsets on the virtual disk are distributed among multiple different tracts, thus increasing the number of tracts referenced for a given block request and the number of cloud storage devices 104 involved in the input/output operations associated with that block request. Further details on the translation capabilities of the cloud client 116 may be found in U.S. patent application Ser. No. 13/598,990, which is entitled "Block-level Access to Parallel Storage," and was filed on Aug. 30, 2012.

In further embodiments, the cloud client 116 determines whether it is operating in connected mode or disconnected mode. "Connected mode" refers to a connection between the computing device 102 and cloud storage devices 104, and "disconnected mode" refers to the lack of a connection between the computing device 102 and cloud storage devices 104. The cloud client 116 may determine whether it is operating in connected mode or disconnected mode periodically, in response to a notification of an event, such as a connection event or a loss-of-connection event.

When operating in connected mode, the cloud client 116 receives a write request, and translates that request for the cloud storage devices 104, the cloud client 116 first writes the data and metadata associated with that request to the cloud storage 118 of one or more of the cloud storage devices 104. The cloud storage 118 may be memory, removable storage, or non-removable storage of any of the types described in further detail herein. The metadata written may include a unique identifier, such as a globally unique identifier (GUID), a tract identifier, a version identifier for the data, and a checksum for the data. The cloud storage devices 104 store the metadata and data as expanded blocks 120 in the cloud storage 118, each expanded block including one data item and its associated metadata record. The cloud storage device(s) 104 receiving the data then respond to the cloud client 116 with an indication of the success of the write, and the cloud client 116 responds to the requesting application 110 through the virtual disk driver 114 and file system 112, providing the indication.

After providing the indication to the requesting application 110, the cloud client 116 mirrors the write to local storage 122 of the computing device 102. The local storage 122 may be memory, removable storage, or non-removable storage of any of the types described in further detail herein. The cloud client 116 partitions the local storage 122 into two areas: a first area 124 for data and a second area 126 for metadata. These areas may or may not be contiguous locations in the local storage 122. In mirroring the write, the cloud client 116 first writes the data to the first area 124 and then writes the metadata to the second area 126. The metadata written to the second area 126 may include the version identifier for the data and a checksum for the data.

When the cloud client 116 is operating in connected mode and receives a read request, the cloud client 116 retrieves the data sought by the read request from the cloud storage 118 of the cloud storage devices 104.

In various embodiments, when the cloud client 116 is operating in disconnected mode and receives a write request, the cloud client 116 writes the data and metadata for that request to local storage 122. Because the cloud client 116 is disconnected from the cloud storage devices 104, it must provide the data and metadata to the cloud storage devices 104 until the cloud client 116 reconnects to the cloud storage devices 104. In writing to the local storage 122 in disconnected mode, the cloud client 116 reverses the order in which it writes the data and metadata. In disconnected mode, the cloud client 116 first writes the metadata to the second area 126 and then writes the data to the first area 124. The cloud client 116 reverses the order to avoid issues of data integrity when reconciling the cloud storage 118 and local storage 122.

When the cloud client 116 is operating in disconnected mode and receives a read request, the cloud client 116 retrieves the data sought by the read request from the local storage 122.

In some embodiments, the cloud client 116 determines that the computing device 102 has recovered from a crash and that the crash occurred while the computing device 102 was operating in connected mode. In response, the cloud client 116 initiates a reconciliation process between the local storage 122 and the cloud storage 118. As part of the reconciliation process, the cloud client 116 retrieves metadata records from the cloud storage 118 of the cloud storage devices 104. The cloud client 116 then compares version identifiers from the retrieved metadata to version identifiers from metadata records stored in the second area 126 of the local storage 122. Because the cloud client 116 always writes to the cloud storage 118 in connected mode before mirroring those writes, the cloud storage 118 will either have a more recent version of a given data item than the local storage 122 or the same version. The cloud client 116 then updates ones of the data items and their corresponding metadata records on the local storage 122 with counterparts retrieved from the cloud storage 118 when the comparisons for those ones of the data items indicate that the cloud storage 118 has the more recent versions.

The cloud client 116 may also be configured to determine that the computing device 102 has transitioned from disconnected mode to connected mode. In response, the cloud client 116 initiates a reconciliation process between the local storage 122 and the cloud storage 118. As part of the reconciliation process, the cloud client 116 retrieves metadata records from the cloud storage 118 of the cloud storage devices 104. The cloud client 116 then compares version identifiers from the retrieved metadata to version identifiers from metadata records stored in the second area 126 of the local storage 122. Because the cloud client 116 writes only to the local storage 122 while in disconnected mode, the local storage 122 will either have a more recent version of a given data item than the cloud storage 118 or the same version. The cloud client 116 then updates ones of the data items and their corresponding metadata records on the cloud storage 118 with counterparts retrieved from the local storage 122 when the comparisons for those ones of the data items indicate that the local storage 122 has the more recent versions.

In some embodiments, the cloud client 116 maintains an in-memory representation that tracks the writes made in disconnected mode. The cloud client 116 may then use this in-memory representation as part of the reconciliation process and simply provide the tracked writes to the cloud storage 118, avoiding the need to retrieve metadata records, iterate through the second area 126, or compare version identifiers.

In various embodiments, the cloud client 116 may determine that the computing device 102 has recovered from a crash and that the crash occurred while the computing device 102 was operating in disconnected mode. In response, the cloud client 116 works with the file system 112 to detect torn local writes using mechanisms of the file system (the file system possesses such mechanisms to recover from crashes that occur while local storage is handling writes). When the cloud client 116 transitions from disconnected mode to connected mode, the cloud client 116 performs the reconciliation process described above for transitioning from disconnected mode to connected mode.

In some embodiments, the processor(s) 128 is a microprocessing unit (MPU), central processing unit (CPU), a graphics processing unit (GPU), or any other sort of processing unit. Among other capabilities, the processor 128 can be configured to fetch and execute computer-readable processor-accessible instructions stored in memory 108, such as the instructions represented by modules 110-116.

In some embodiments, the network interfaces 130 include any sort of network interfaces 130 known in the art. For example, network interfaces 130 may include a wired interface, such as an Ethernet interface, for wired network communications. Network interfaces 130 may also or instead include any one or more of a wireless LAN interface, or a near field interface.

Computing device 102 may also include additional data storage devices (removable and/or non-removable) such as, for example, magnetic disks, optical disks, or tape. Such additional storage is illustrated in FIG. 1 by removable storage 132 and non-removable storage 134. Memory 108, removable storage 132 and non-removable storage 134 are all examples of computer storage media. As used herein, "computer-readable media" includes computer storage media and communication media. Computer storage media includes volatile and non-volatile, removable and non-removable media implemented in any method or technology for storage of information, such as computer-readable instructions, data structures, program modules, or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media can embody computer-readable instructions, data structures, program modules, or other data in a modulated data signal, such as a carrier wave. As defined herein, computer storage media does not include communication media.

In some embodiments, the I/O devices 136 include any sort of output devices known in the art, such as a display, speakers, a vibrating mechanism, or a tactile feedback mechanism. I/O devices 136 also include ports for one or more peripheral devices, such as headphones, peripheral speakers, or a peripheral display. I/O devices 136 further include any sort of input devices known in the art. For example, I/O devices 136 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-controller and/or designated navigation buttons, or the like.

While example device configurations and architectures have been described, other implementations are not limited to the particular configurations and architectures described herein. Thus, this disclosure can extend to other implementations, as would be known or as would become known to those skilled in the art.

Example Processes

FIGS. 2-5 illustrate example processes. These processes are illustrated as logical flow graphs, each operation of which represents a sequence of operations that can be implemented in hardware, software, or a combination thereof. In the context of software, the operations represent computer-executable instructions stored on one or more computer storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 2:
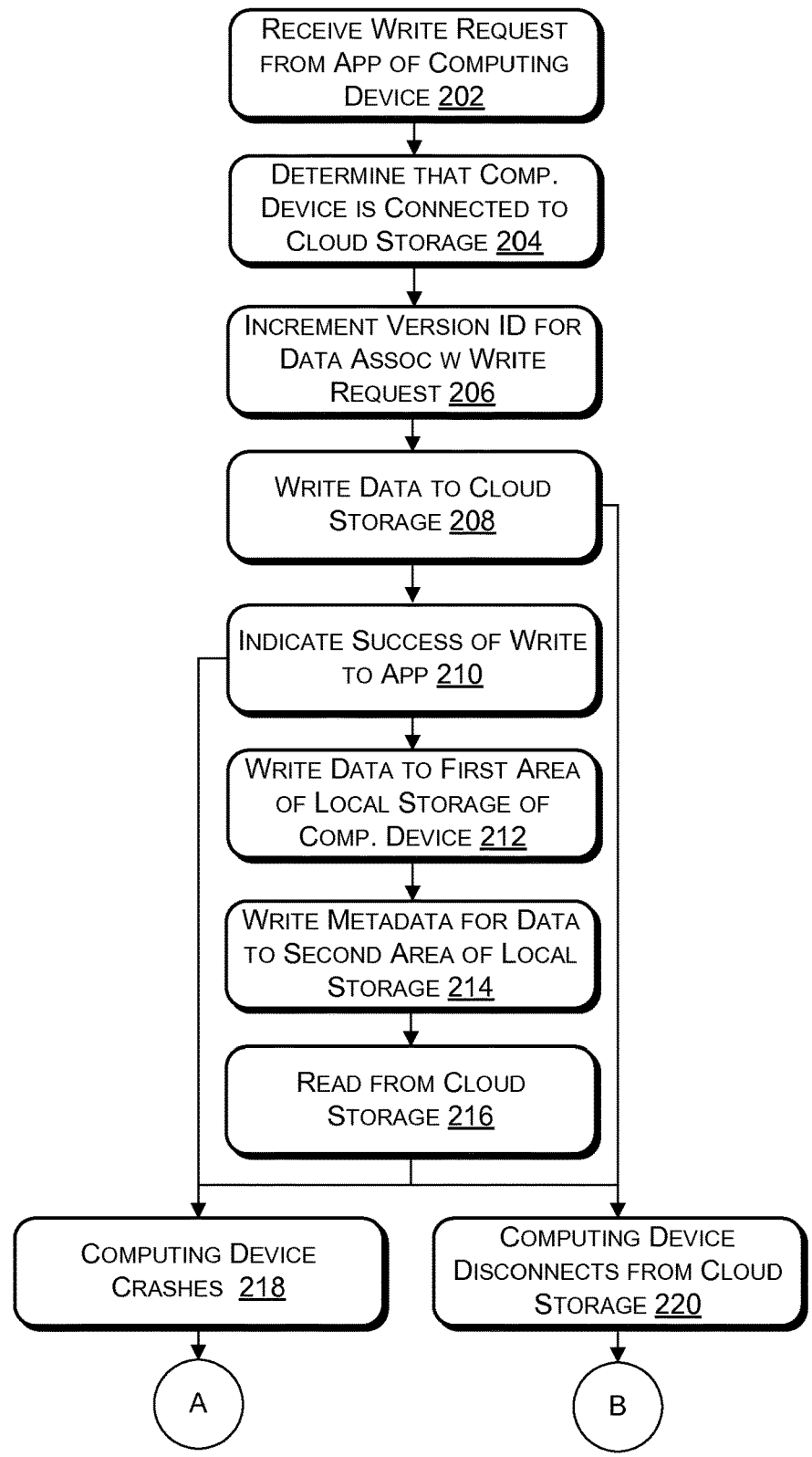
FIG. 2 illustrates an example process for writing to cloud storage and asynchronously mirroring writes to local storage of the computing device.

FIG. 2 illustrates an example process for asynchronously mirroring writes to the cloud storage devices to local storage of the computing device. The process includes, at 202, a computing device receiving a write request from an application of the computing device. At 204, the computing device determines that the computing device is connected to the cloud storage (i.e., is operating in connected mode). In some embodiments, the order of operations 202 and 204 may be reversed.

At 206, the computing device increments a version identifier for a data item associated with the write request. The version identifier may be included in a metadata records associated with the data item.

At 208, the computing device writes the data item associated with the write request, as well as its metadata record, to cloud storage. The writing of data and metadata to the cloud storage may be atomic, with the writing of both data and metadata succeeding or the writing of both data and metadata failing. This writing of data and metadata may include writing the data item, a GUID, a tract identifier, the version identifier, and a checksum. In some embodiments, the computing device determines that it is disconnected from cloud storage responsive to determining that the write to the cloud storage has failed and proceeds to the operation described at block 220.

After writing the data and metadata to the cloud storage, the computing device asynchronously mirrors the write to its local storage. This asynchronous mirroring includes responding, at 210, to the write request of the application by indicating to the application that the write request has succeeded and after or while responding at 210, writing the data and metadata to the local storage. Writing to local storage includes writing, at 212, the data item to a first area of the local storage and writing, at 214, the metadata record for the data item to a second area of the local storage. The computing device performs the writing of the data item before the writing of the metadata record when operating in connected mode.

At 216, the computing device receives a read request and reads one or more data items associated with the read request from cloud storage. While operation 216 is shown as following operations 202-214, it may occur before, during, or after any of the operations 202-214.

At 218, the computing device crashes. This crash may occur before, during, or after any of the operations 202-216. Following the crash, the computing device may perform the operations shown in FIG. 3 and further described herein.

At 220, the computing device disconnects from the cloud storage (i.e., enters disconnected mode). After transitioning to disconnected mode, the computing device may perform the operations shown in FIG. 4 and further described herein.

Figure 3:
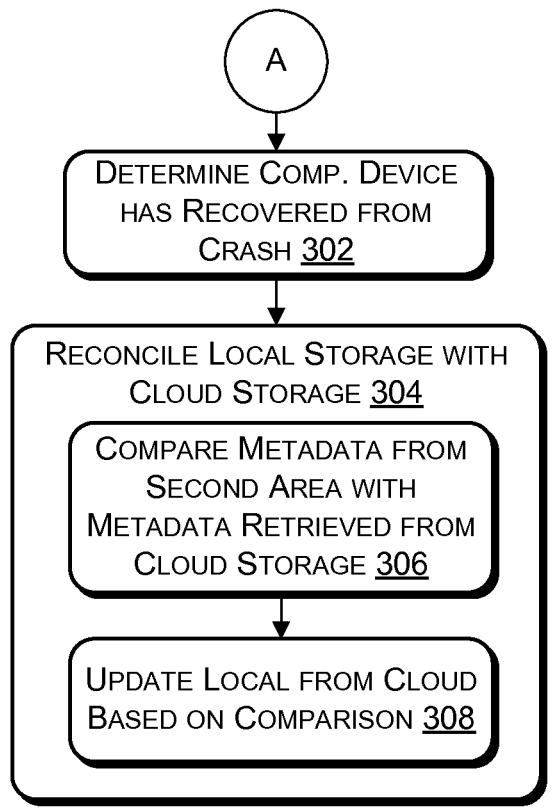
FIG. 3 illustrates an example process for reconciling local storage of a computing device with cloud storage following a crash of the computing device.

FIG. 3 illustrates an example process for reconciling local storage of a computing device with cloud storage following a crash of the computing device. The process includes, at 302, a computing device determining that the computing device has recovered from a crash.

At 304, the computing device reconciles the local storage of the computing device with the cloud storage. At 306, the reconciliation includes comparing version identifiers included in metadata records from the second area of the local storage to version identifiers included in metadata records retrieved from the cloud storage. At 308, when the comparison for a given data item indicates that the cloud storage has a more recent version of the data item, the computing device updates the local storage with the data item and corresponding metadata record stored by the cloud storage.

Figure 4:
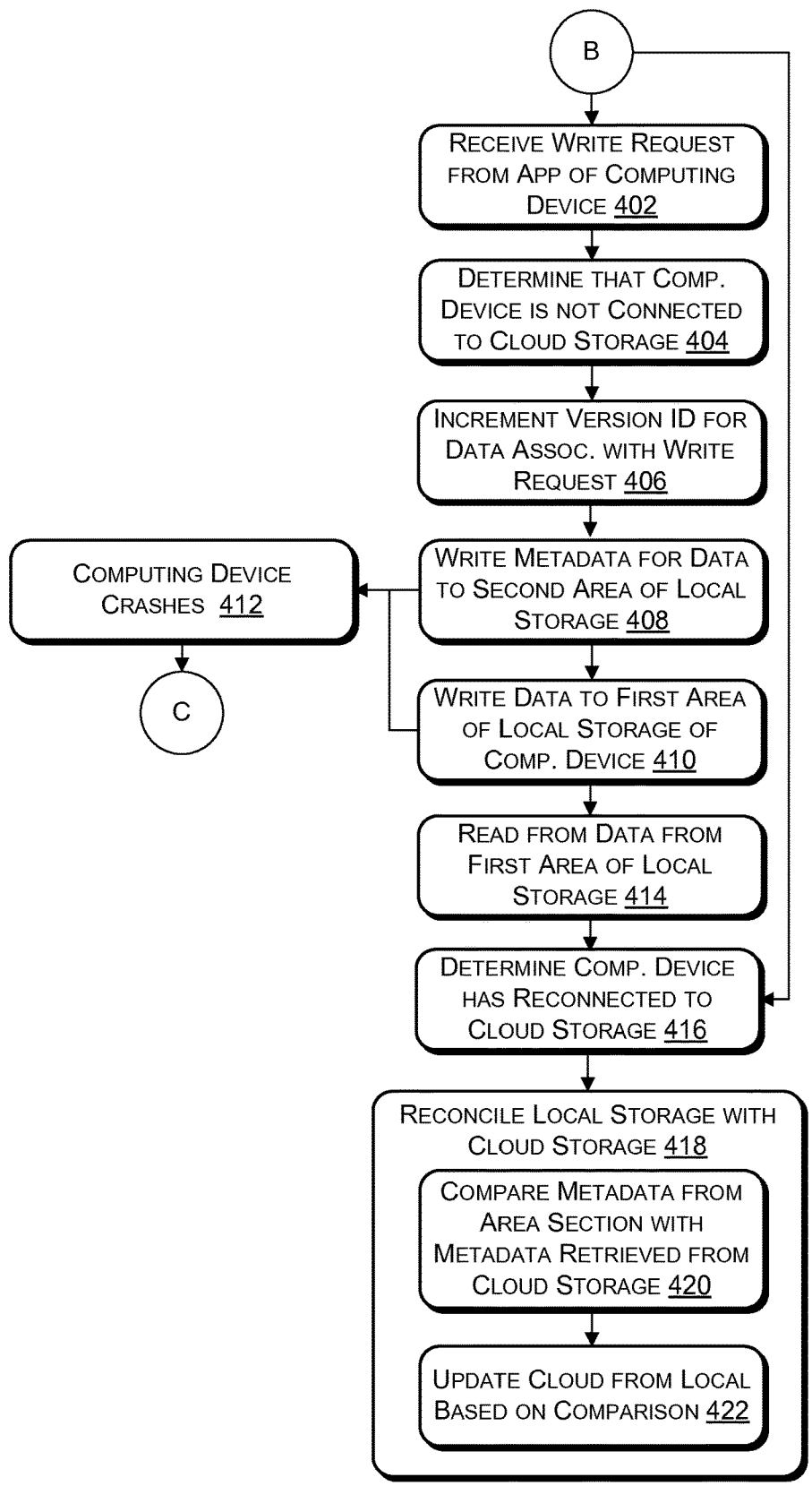
FIG. 4 illustrates an example process for disconnected operation of a computing device and reconciliation of local storage of the computing device to cloud storage upon reconnecting to the cloud storage.

FIG. 4 illustrates an example process for disconnected operation of a computing device and reconciliation of local storage of the computing device to cloud storage upon reconnecting to the cloud storage. The process includes, at 402, a computing device receiving a write request from an application of the computing device. At 404, the computing device determines that the computing device is disconnected to the cloud storage (i.e., is operating in disconnected mode). In some embodiments, the order of operations 402 and 404 may be reversed.

At 406, the computing device increments a version identifier for a data item associated with the write request. The version identifier may be included in a metadata records associated with the data item.

At 408, the computing device then writes the metadata record for the data item associated with the write request to a second area of the local storage. At 410, the computing device writes the data item to a first area of the local storage. The computing device performs the writing of the metadata record before the writing of the data item when operating in disconnected mode. This writing of data and metadata may include writing the data item, the version identifier, and a checksum.

In some circumstances, the computing device may crash following operation 408 or 410. Following the crash, the computing device may perform the operations shown in FIG. 5 and further described herein.

At 414, the computing device receives a read request and reads one or more data items associated with the read request from local storage. While operation 414 is shown as following operations 402-412, it may occur before, during, or after any of the operations 402-412.

At 416, the computing device determines that the computing device is now connected to the cloud storage (i.e., has transitioned to connected mode). This determination at 416 may be performed before, during, or after any of operations 402-416.

After determining that the computing device is connected to cloud storage, the computing device, at 418, reconciles the local storage of the computing device with the cloud storage. At 420, the reconciliation includes comparing version identifiers included in metadata records from the second area of the local storage to version identifiers included in metadata records retrieved from the cloud storage. At 422, when the comparison for a given data item indicates that the local storage has a more recent version of the data item, the computing device updates the cloud storage with the data item and corresponding metadata record stored by the local storage.

Figure 5:
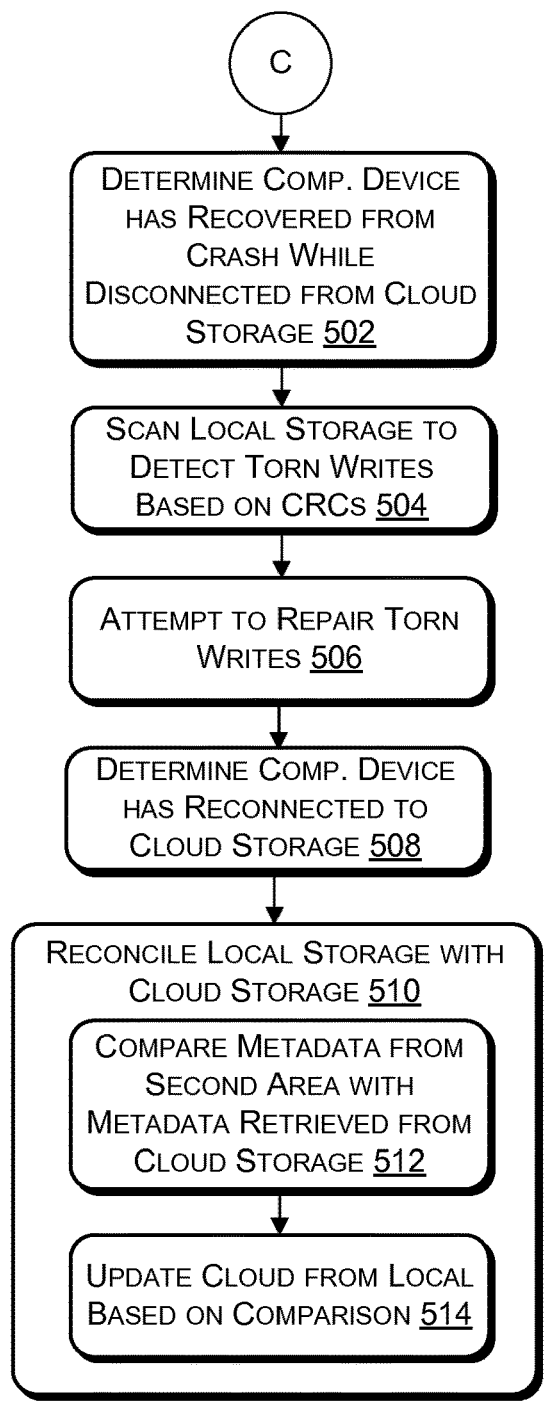
FIG. 5 illustrates an example process for reconciling local storage of a computing device with cloud storage following disconnected operation during which the computing device crashed.

FIG. 5 illustrates an example process for reconciling local storage of a computing device with cloud storage following disconnected operation during which the computing device crashed. The process includes, at 502, a computing device determining that the computing device has recovered from a crash that occurred while the computing device was in disconnected mode.

At 504, the computing device scans the local storage to detect torn writes based on checksums. This may involve calculating a checksum for each data item in the local storage and comparing that checksum to the checksum stored in the metadata record for that data item. At 506, a file system of the computing device then attempts to repair any torn writes.

At 508, the computing device determines that the computing device is now connected to the cloud storage (i.e., has transitioned to connected mode). After determining that the computing device is connected to cloud storage, the computing device, at 510, reconciles the local storage of the computing device with the cloud storage. At 512, the reconciliation includes comparing version identifiers included in metadata records from the second area of the local storage to version identifiers included in metadata records retrieved from the cloud storage. At 514, when the comparison for a given data item indicates that the local storage has a more recent version of the data item, the computing device updates the cloud storage with the data item and corresponding metadata record stored by the local storage.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A device comprising:
one or more processors;
memory storing instructions that, when executed by the one or more processors, cause the device to perform operations comprising:
receiving a write request from an application while the device is operating in a connected mode in which the device is connected to cloud storage, the connected mode defining a first order in which instances of data and metadata for the instances of data are to be written to local storage of the device;
writing a first instance of data specified by the write request to the cloud storage;
indicating success of the write request to the application;
after indicating the success of the write request to the application, writing the first instance of data to a first area of the local storage;
after writing the first instance of data to the first area of the local storage, writing metadata for the first instance of data to a second area of the local storage;
determining that the device has been disconnected from the cloud storage and is operating in a disconnected mode, the disconnected mode defining a second order in which the instances of data and the metadata for the instance of data are to be written to the local storage, the second order being reversed compared to the first order to avoid data integrity issues associated with reconciling the cloud storage and the local storage;
writing, while the device is operating in the disconnected mode, metadata for a second instance of data to the second area of the local storage; and
after writing the metadata for the second instance of data to the second area of the local storage, writing the second instance of data to the first area of the local storage.

2. The device of claim 1, wherein, while the device is disconnected from the cloud storage, the device reads from and writes to the local storage.

3. The device of claim 1, wherein the operations further comprise reconciling the local storage with the cloud storage based at least on a comparison of metadata stored in the second area of the local storage with metadata received from the cloud storage the reconciling comprises:
scanning the local storage to detect torn writes, the detecting being based at least on calculating checksums,
repairing the torn writes,
comparing version identifiers included in the metadata stored in the second area of the local storage with version identifiers included in the metadata received from the cloud storage, and
based on the comparison indicating that the local storage has a more recent version of the second instance of data than the cloud storage, updating the cloud storage with the second instance of data from the local storage.

4. The device of claim 1, wherein metadata stored in the second area of the local storage and metadata received from the cloud storage include version identifiers.

5. One or more computer storage devices having stored thereon computer-executable instructions configured to program a computing device to perform operations comprising:
receiving a first write request from an application of the computing device while the computing device is operating in a connected mode in which the computing device is connected to cloud storage, the connected mode defining a first order in which instances of data and metadata for the instances of data are to be written to local storage of the computing device;
writing a first instance of data specified by the first write request to the cloud storage;
indicating success of the first write request to the application;
after indicating the success of the first write request to the application, writing the first instance of data to a first area of the local storage;
after writing the first instance of data to the first area of the local storage, writing metadata for the first instance of data to a second area of the local storage;
determining that the computing device has been disconnected from the cloud storage and is operating in a disconnected mode, the disconnected mode defining a second order in which the instances of data and the metadata for the instance of data are to be written to the local storage, the second order being reversed compared to the first order to avoid data integrity issues associated with reconciling the cloud storage and the local storage;
receiving, while the computing device is operating in the disconnected mode, a second write request;
writing, while the computing device is operating in the disconnected mode, metadata for a second instance of data to the second area of the local storage; and
upon completion of the writing the metadata for the second instance of data to the second area of the local storage, writing the second instance of data to the first area of the local storage.

6. The one or more computer storage devices of claim 5, the operations further comprising, prior to writing the first instance of data to the cloud storage, determining that the computing device is connected to the cloud storage.

7. The one or more computer storage devices of claim 5, the operations further comprising reading from the cloud storage when the computing device is connected to the cloud storage and reading from the local storage when the computing device is disconnected from the cloud storage.

8. The one or more computer storage devices of claim 5, the operations further comprising incrementing a version identifier associated with the first instance of data,
   wherein the writing the first instance of data to the cloud storage includes writing the incremented version identifier as the metadata for the first instance of data to the cloud storage, and
   wherein the writing the first instance of data to the local storage includes writing the incremented version identifier as the metadata for the first instance of data to the local storage.

9. A system comprising:
   a cloud storage device having a first processor and first one or more modules that, when operated by the first processor, receive writes including data items and metadata for the data items and store each data item contiguously with its metadata as an expanded block; and
   a client device having a second processor and second one or more modules that, when operated by the second processor, write the data items and the metadata to the cloud storage device and store the data items and the metadata in local storage of the client device, wherein:
      while the client device is operating in a connected mode in which the client device is connected to the cloud storage device, a first data item is stored in a first area of the local storage before metadata for the first data item is stored in a second area of the local storage in accordance with a first order in which the data items and the metadata are to be written to the local storage; and
      while the client device is operating in a disconnected mode in which the client device is disconnected from the cloud storage device, a second data item is stored in the first area of the local storage after the metadata for the second data item is successfully stored in the second area of the local storage in accordance with a second order in which the data items and the metadata are to be written to local storage, the second order being reversed compared to the first order to avoid data integrity issues associated with reconciling the cloud storage device and the local storage.

10. The system of claim 9, wherein the client device further includes a memory bitmap and the client device utilizes the memory bitmap to track writes to the local storage while the client device is disconnected from the cloud storage device.

11. The system of claim 9, wherein the second one or more modules include a virtual disk driver and a cloud client.

12. The system of claim 11, wherein the virtual disk driver receives write requests from applications of the client device and provides those write requests to the cloud client.

13. The system of claim 11, wherein the cloud client receives the write requests from the virtual disk driver and performs the writing of the data items and the metadata to the cloud storage device and the storing of the data items and the metadata in the local storage.

14. The device of claim 1, the operations further comprising incrementing a version identifier associated with the first instance of data,
   wherein the writing the first instance of data to the cloud storage includes writing the incremented version identifier as the metadata for the first instance of data to the cloud storage, and
   wherein the writing the first instance of data to the local storage includes writing the incremented version identifier as the metadata for the first instance of data to the local storage.

15. The device of claim 1, wherein the device further comprises a memory bitmap and the device utilizes the memory bitmap to track writes to the local storage while the device is disconnected from the cloud storage.

16. The one or more computer storage devices of claim 5, the operations further comprising reconciling the local storage with the cloud storage based at least on a comparison of metadata stored in the first area of the local storage with metadata received from the cloud storage, the reconciling comprises:
   scanning the local storage to detect torn writes, the detecting being based at least on calculating checksums,
   repairing the torn writes,
   comparing version identifiers included in the metadata stored in the first area of the local storage with version identifiers included in the metadata received from the cloud storage, and
   based on the comparison indicating that the local storage has a more recent version of the second instance of data than the cloud storage, updating the cloud storage with the second instance of data from the local storage.

17. The system of claim 11, wherein the second one or more modules are configured to provide an indication of a successful write to an application that requested the write without awaiting a result of mirroring the write to the local storage.

18. The system of claim 11, wherein the metadata stored in the local storage and the cloud storage includes version identifiers.

19. The system of claim 11, wherein the data items and the metadata are stored in separate areas of the local storage.

* * * * *